_United States Patent Office_

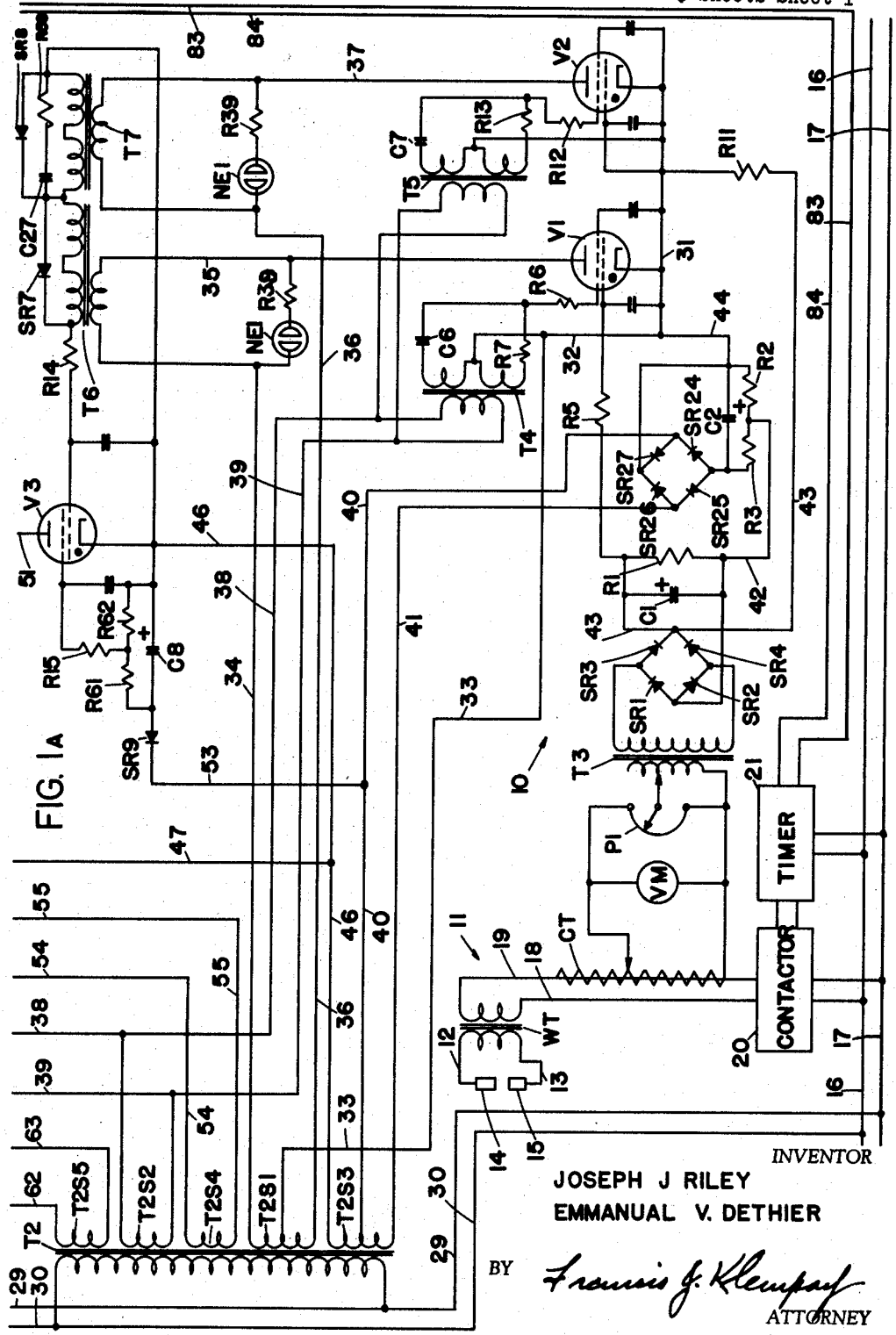

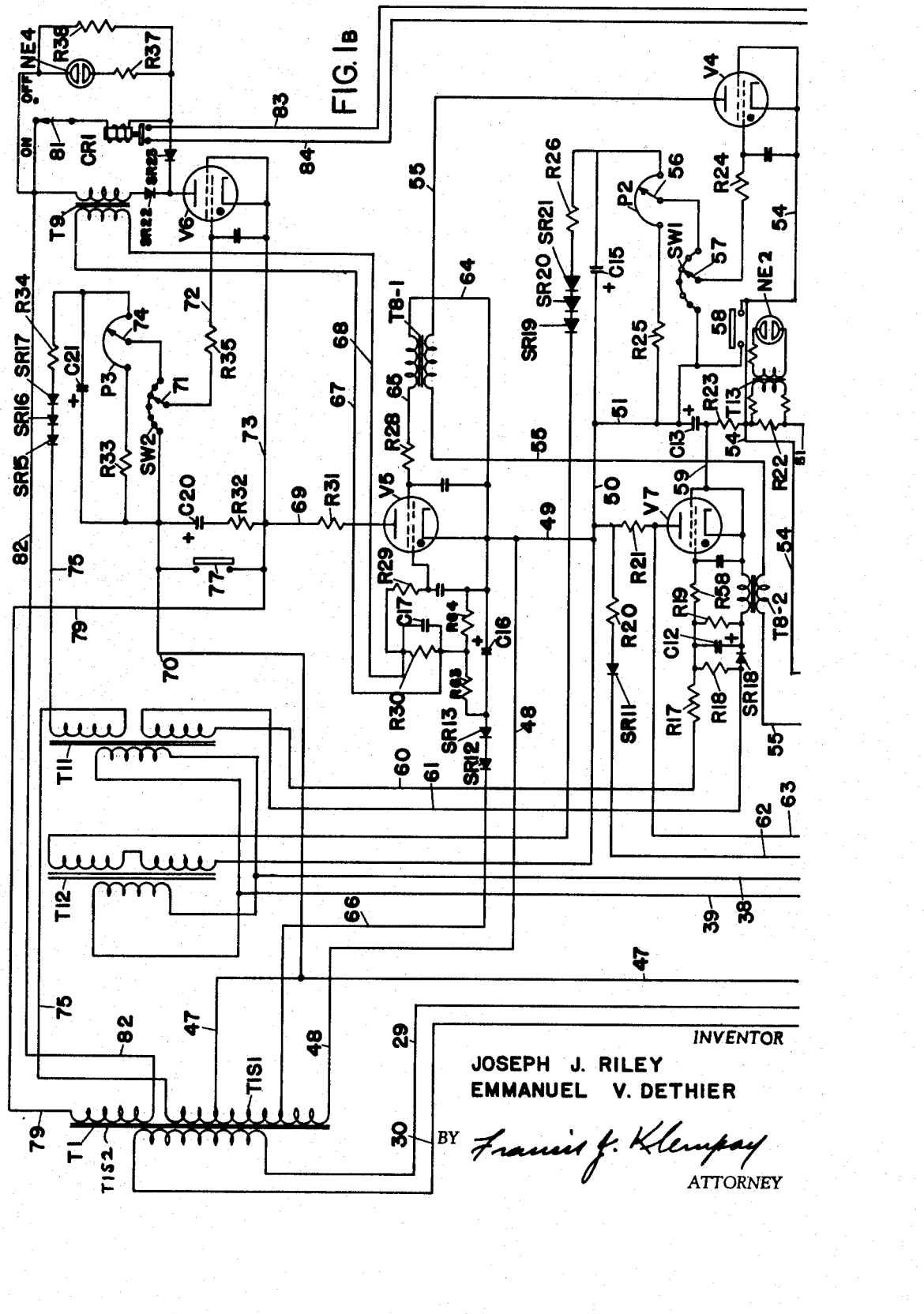

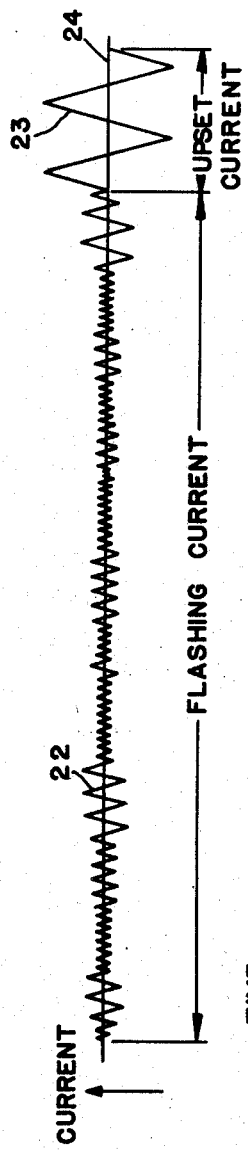
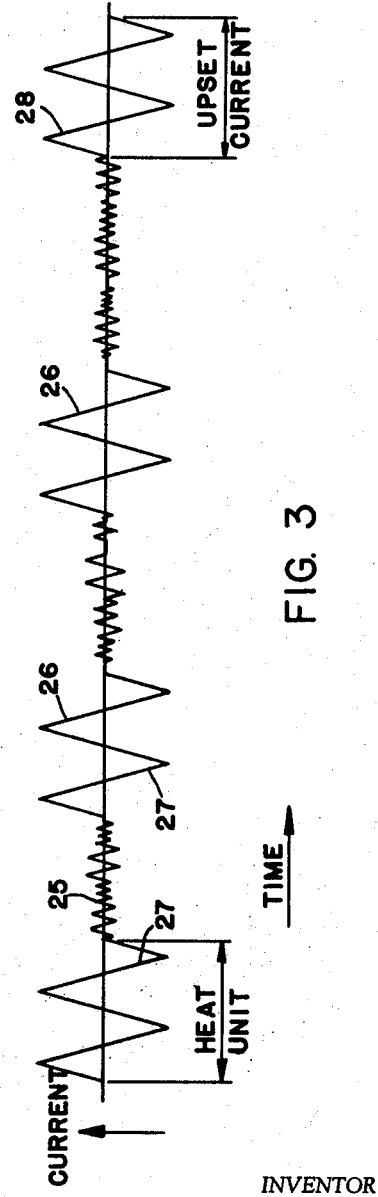

3,151,290
Patented Sept. 29, 1964

3,151,290
CURRENT MONITOR FOR FLASH WELDERS
AND THE LIKE
Joseph J. Riley and Emmanuel Victor Dethier, Warren,
Ohio, assignors to The Taylor-Winfield Corporation,
Warren, Ohio, a corporation of Ohio
Filed Mar. 5, 1959, Ser. No. 797,441
15 Claims. (Cl. 323—58)

The present invention relates generally to the art of electric welding, and more particularly to the provision of new and novel current monitoring apparatus for flash welders and the like.

As will be understood by those skilled in this art, the term "flash welding" is used to designate the method of welding wherein the adjacent edges of two workpieces to be welded are accurately positioned in closely adjacent but spaced parallel relation with respect to each other. The workpieces are then moved relatively toward each other while electrical potential is supplied thereto to cause an arc or flashing between the adjacent edges of the workpieces to soften the same. The edges of the workpieces are then caused to butt under considerable pressure and high amperage current flows across the butting edges to fuse and weld the workpieces together.

Although the above described method is quite old in the art and has been widely and successfully employed for the welding of workpieces, the need exists for monitoring apparatus which is capable of indicating to the operator that a defective weld is taking place and/or which is capable in interrupting the sequence of the flash welder to stop the welding operation. Defective welds may result from a variety of reasons—such as drastic changes in the line voltage used to supply power to the flash welder, erratic movement of the workpieces relatively toward each other, improper loading and positioning of the workpieces, etc., for example—all of which cause excessive current to flow between the workpieces. Such excessive flow of current in the workpieces not only provides unacceptable welds but may also result in extensive damage to the flash welder and the various electrical control apparatus associated therewith.

In view of the above, it is the primary or ultimate object of the present invention to provide a new and novel current monitor for flash welding apparatus and the like which is adapted to indicate to the operator that a defective weld is taking place and/or interrupt the sequence of the flash welder. In this manner it is insured that only acceptable welds will be produced and expensive damage to the flash welder is precluded.

The current monitor of the present invention is adapted to respond to the current actually flowing between the adjacent edges of the workpieces being welded. During a normal flash welding operation the current flowing between the edges of the workpieces has a rather low relative value although the wave form of the same is highly erratic. When the workpieces are butted, or during "upset" as it is commonly referred to in the art, the current flowing in the workpieces is of a much higher relative value than that evidenced during arcing or flashing. However, when a defective weld is being completed the current during arcing or flashing is much more erratic and is characterized by one or more "heat units." Each of the heat units is composed of a series of successive half cycles of current of a value closely approximating the value of the welding current during the upset. The current monitor of the present invention is designed to be responsive to the excessive current flow during unacceptable welding operations to indicate that a defective welding operation is being performed.

Another object of the present invention is to provide a current monitor for flash welders and the like which is responsive to the above mentioned heat units to indicate and/or interrupt a defective welding operation.

Still another important object of the present invention is to provide current monitoring control apparatus for flash welders and the like which is easily and readily adjustable to indicate and/or interrupt welding operations which will result in defective welds only within predetermined and preset tolerances. For some purposes, a flash weld may be acceptable even though a relatively high number of heat units were evidenced during the welding operation while for other purposes more than one or two of the heat units may be objectionable. The current monitor of the present invention is adjustable whereby the same is responsive only when the preset number of heat units have occurred in any given welding operation. This greatly increases the versatility of the current monitor in that the same is adapted to be used in connection with almost any flash welding operation.

A further object of the invention is to provide current monitoring control apparatus for flash welders and the like which embodies a plurality of cascaded counters and storage means for counting the number of half cycles of excessive current flow and the number of heat units during any given flash welding operation. As will be hereinafter more fully explained, each time a half cycle of excessive current flows between the workpieces the monitor is operative to record this occurrence. When a predetermined and adjustable number of these half cycles have been recorded a heat unit is noted by the current monitor. When a predetermined and adjustable number of the heat units have been recorded the monitor is operative to indicate and/or interrupt the defective flash welding operation.

A still further object of the invention is to provide a current monitor for flash welders and the like which can be used in connection with flash welders presently in operation without expensive and time consuming modification of the same.

Yet another object of the invention is to provide a current monitor of the type above described which is characterized by its extreme simplicity, low cost of manufacture, ruggedness and ability to withstand continuous operation, compactness and high operating efficiency.

Although the current monitor of the invention is specifically designed for and is ideally adapted for employment with flash welders, it should be clearly understood from the outset that the same may be employed with other types of apparatus for indicating when a predetermined number of current pulses of a certain value have been passed. Such uses of the current monitor will be apparent to those skilled in the art.

The above, as well as other objects and advantages of the invention, will become more readily apparent upon consideration of the following specification and accompanying drawing wherein there is disclosed a preferred embodiment of the invention.

In the drawing:
FIGURE 1, composed of two parts—FIGURES 1A and 1B—is a schematic circuit diagram showing a current monitor for flash welders and the like constructed in accordance with the teachings of the present invention;

FIGURE 2 is a graph depicting the current flowing between the workpieces being welded during a normal and acceptable flash welding operation; and FIGURE 3 is a graph depicting the current flowing between the workpieces being welded during an abnormal and unacceptable flash welding operation.

Referring now to the drawing, and initially to FIGURE 1 thereof, there is shown a schematic circuit diagram of a current monitor, generally indicated by the reference numeral 10, constructed in accordance with the teachings of the present invention which is connected in operative relation with schematically illustrated flash welding apparatus 11. The flash welding apparatus comprises a welding transformer WT whose secondary terminals 12 and 13 are connected to the workpieces 14 and 15, respectively. The primary winding of the welding transformer WT is connected with the supply lines 16 and 17 by means of conductors 18 and 19 and a contactor assembly 20. The contactor assembly 20 serves as a means for controlling the flow of power to the welding transformer WT and may comprise a pair of inversely connected mercury arc discharge valves, commonly referred to as ignitrons, not shown. A sequence timer 21 is provided for controlling the conduction of the contactor assembly 21 and is also operative to sequence the mechanical functioning of the flash welding apparatus. The arrangement is such that when the contactor assembly 20, under the control of the sequence timer 21, allows current to flow from the supply lines 16 and 17 to the welding transformer WT so that a suitable potential will be applied across the workpieces 14 and 15. Initially the workpieces are accurately positioned with respect to each other whereby the edges to be welded are in spaced parallel relation. Then the workpieces are moved relatively toward each other while a predetermined potential is applied thereto and during this movement a flashing or arcing takes place between the edges of the workpieces. The movement of the workpieces is very accurately controlled and eventually the same butt and a high amperage upset current is caused to flow across the butted edges of the workpieces to fuse and weld the same together. Of course, the flash welding apparatus 11 would comprise movable platens, gauging means, platen moving means and other mechanical apparatus and means, not particularly shown.

The above described apparatus and method is well known and widely employed in the welding art and in and of itself does not form a part of the present invention. The welding transformer WT, the contactor assembly 20 and the sequence timer 21 may be of any desired construction adapted to complete a flash welding operation.

As mentioned previously, the current monitor 10 of the present invention is adapted to indicate to the operator and/or block the sequence timer 21 to stop the flash welding operation when a defective welding operation is being performed. For a complete understanding of the basis of operation of the present invention reference should now be had to FIGURES 2 and 3 of the drawing wherein are shown graphs depicting the wave forms of the welding current during acceptable and unacceptable flash welding operations, respectively. In the case of an acceptable welding operation, FIGURE 2, the current during flashing or arcing, designated by the reference numeral 22, is highly erratic but of a relatively low value. The upset current 23, however, which immediately follows the arcing or flashing current 22, is of a much higher value and comprises a series of half cycles of current of alternate polarity with respect to the reference line 24. It will be noted that the upset current is not as erratic as the flashing or arcing current and this is to be expected since the workpieces at this time are butted under considerable force.

In FIGURE 3 of the drawing the current trace during a defective flash welding operation is depicted. In the case of a defective welding operation, the flashing or arcing current 25 is again highly erratic and is composed of a series of spaced heat units 26. Each of the heat units is made up of one or more half cycles 27 of alternate polarity current which is of a much higher value than the normal flashing or arcing current. It will be noted that the current value of the heat units closely approximates the value of the final upset current 28 when the edges of the workpieces are butted. During each of the heat units 26 the workpieces actually butt together instead of maintaining the desired and requisite flashing or arcing gap and the current obtains a level or value far in excess of the normal arcing or flashing current. The resultant heat units of high current value cause excessive heating of the workpieces and provide an unacceptable weld. The heat units may be caused from any number of a variety of reasons, such as changes in the potential of the supply lines 16 and 17, improper loading of the workpieces, erratic platen movement, etc., for example.

The current monitor of the present invention, as will be hereinafter more fully explained, is adapted to sense each half cycle of excessive current flowing in the heat units. After a predetermined and adjustable preset number of such half cycles of excessive current flow have been recorded a heat unit is recorded and after a predetermined and adjustable preset number of heat units have been recorded the monitor indicates to the operator and/or blocks the sequence timer 21 to stop the defective welding operation. The number of half cycles of excessive current making up each heat unit and the number of heat units required before the current monitor is adapted to perform its indicating and/or blocking function are completely adjustable as will be more fully apparent in the following description.

Considering now the construction and organization of the flash welding current monitor 10, there are provided a pair of electrical discharge devices or valves V1 and V2, preferably thyratrons, which are connected in inverse relation across the secondary T2S1 of a transformer T2 whose primary is connected by the conductors 29 and 30 to the supply lines 16 and 17. The cathodes of the discharge devices V1 and V2 are connected by conductors 31, 32 and 33 to the center tap of secondary T2S1 of the transformer T2. The anode of the discharge device V1 is connected to the upper terminal of the transformer secondary T2S1 by a circuit which includes the conductor 34, the primary of a transformer T6 and conductor 35 while the anode of the discharge device V2 is similarly connected to the lower terminal of the transformer secondary T2S1 by conductor 36, primary of transformer T7 and conductor 37. Thus, upon proper conditioning of the control grids of discharge devices V1 and V2 the same are adapted to conduct on alternate half cycles.

The discharge devices V1 and V2 are each provided with a screen grid-cathode biasing circuit. The screen grid-cathode biasing circuit for the discharge device V1 comprises resistor R6, resistor R7, capacitor C6 and center tapped transformer T4 whose primary is connected by conductors 38 and 39 to the secondary T2S2 of supply transformer T2 while the similar screen grid-cathode circuit for the discharge device V2 includes resistors R13 and R12, capacitor C7 and center tapped transformer T5 whose primary is also connected to the secondary T2S2 of supply transformer T2. The respective screen grid-cathode circuits associated with the discharge devices V1 and V2 are adapted to apply a phase shifted potential between the screen grids and cathodes thereof.

A common grid-cathode biasing circuit is provided for the discharge devices V1 and V2. This common biasing circuit comprises in part a full wave rectifier bridge composed of rectifiers SR24, SR25, SR26 and SR27 which has two of its taps connected by the conductors 40 and 41 to the center tap and lower terminal of secondary T2S3 of supply transformer T2. Connected across the pair of output terminals of the rectifier bridge is grid bias capacitor C2 which is adapted to be charged by the rectifier bridge with the right terminal thereof positive with respect to its left terminal. A voltage divider network comprising resistors R2 and R3 is connected across the grid bias capacitor C2 and the voltage across the resistor R2 is impressed on the grid of the tube V1 through a circuit including conductor 42, resistor R1 and resistor R5 while this same potential is impressed on the grid of the discharge device V2 by a circuit composed of conductor 42, resistor R1, conductor 43 and resistor R11. The other terminal of the resistor R2 is referenced to the cathodes of the discharge devices V1 and V2 by means of conductors 44 and 31. The arrangement is such that the grid bias capacitor C2 is maintained in a charged condition by the rectifier bridge at all times and impresses a control potential across the grids and cathodes of the discharge devices V1 and V2 which normally maintains the same non-conductive.

Also in the grid-cathode biasing circuit for the discharge devices V1 and V2 is capacitor C1 which is connected across resistor R1 and is adapted to be charged by a full wave rectifier bridge comprising rectifiers SR1, SR2, SR3 and SR4. The input terminals of this rectifier bridge are connected to the secondary winding of a step up transformer T3. The adjustable turns primary of the step up transformer T3 has its movable terminal connected to the center tap of potentiometer P1 while the other terminal of the primary winding of the step up transformer T3 is connected to one of the terminals of this potentiometer. The potentiometer P1 is connected directly across an adjustable tapped current transformer CT which is positioned in operative relation with respect to the primary winding of the welding transformer WT. Thus, the current transformer will provide a voltage signal across the entire resistance of the potentiometer P1 which is directly proportional to the current flowing between the workpieces 14 and 15 during a flash welding operation. That portion of the voltage drop of this signal appearing across the portion of the potentiometer P1 between its lower terminal and the adjustable center tap thereof will be impressed on the full wave rectifier bridge via the step up transformer T3. The voltage so impressed on the rectifier bridge will be rectified to charge the capacitor C1 with the upper terminal thereof assuming a positive charge whereby a voltage is developed across the resistor R1 and impressed on the grid-cathode circuits of the discharge devices V1 and V2 which tends to drive the grids thereof positive with respect to their cathodes. It will be noted that, in essence, the capacitors C1 and C2 serve as direct current biasing sources of opposing polarity, i.e., the capacitor C2 places a negative potential between the grids and cathodes while the capacitor C1 places a positive control potential between the grids and cathodes of these two discharge devices. When the potential across the capacitor C1 obtains a certain value the same will overcome the negative signal supplied by the capacitor C2 to drive the grids of the discharge devices V1 and V2 positive with respect to their cathodes whereby the same may begin to conduct during alternate half cycles of the supply line voltage. The capacitor C2 provides a constant source in that it is always charged to approximately the same potential by the rectifier bridge associated therewith while the capacitor C1 provides a variable source in that it is charged in response to the current level in the welding circuit of the flash welding apparatus.

As mentioned above, the current transformer provides a voltage which is directly proportional to the value of the current in the welding circuit of the flash welding apparatus. If desired, a voltmeter VM may be connected across the output terminals of the current transformer to give a visual indication of the current level in the welding circuit at any given instant of time. Of course, it would be possible to replace the voltmeter with a pen type of voltage recorder to produce permanent traces of the current flow in the welding circuit.

When the charge on capacitor C1 overrides the negative hold off bias supplied by the capacitor C2 the discharge devices V1 and V2 will conduct on alternate half cycles of the supply line voltage. It is preferred, for reasons to be hereinafter more fully explained, that the center tap of the potentiometer P1 be adjusted whereby the charge on the capacitor C1 is not sufficient to trigger the discharge devices V1 and V2 unless and until a current of a value approaching the upset current flows in the welding circuit. In this manner the discharge devices V1 or V2 will fire for each half cycle of excessive current making up the heat units in the arcing or flashing current when a defective flash welding operation is being completed as is evidenced in FIGURE 3 of the drawing.

As mentioned above, the discharge devices V1 and V2 have the primaries of the transformers T6 and T7 in their anode-cathode circuits. Connected across the primaries of these transformers are currents limiting resistors R39 and neon bulbs NE1 which are adapted to flash each time the discharge devices V1 and V2 are conductive to give a visual indication of the number of half cycles of excessive flashing or arcing current taking place during a flash welding operation. The secondaries of these two transformers are connected in series and provide, in combination with conductors 43 and 44, capacitor C27, resistors R59 and R14 and rectifiers SR7 and SR8, a grid-cathode biasing network for discharge device V3. The arrangement is such that when discharge device V1 fires the transformer T6 is energized to supply a positive signal to the grid of the discharge device V3. When discharge device V2 fires transformer T7 is energized and the decaying flux therein also supplies a positive signal to the grid of the discharge device V3. The positive signals supplied to the grid of the discharge device V3 by this grid-cathode network upon conduction of either the discharge device V1 or the discharge device V2 are sufficient to trigger this discharge device V3 whereby the same begins to conduct. Thus, the discharge device V3 will conduct on alternative half cycles of the supply voltage a certain number of times depending upon the number of times that the discharge devices V1 and V2 conduct.

The anode-cathode circuit of the discharge device V3 comprises a conductor 46 which connects the cathode thereof with the upper terminal of T2S3 of the supply transformers T2. The conductor 46 and the secondary T2S3 are connected by conductor 47 to one tap of a secondary T1S1 of a supply transformer T1 whose primary is connected across the supply lines 16 and 17 by the conductors 29 and 30. The lower terminal of the secondary T1S1 is connected by conductors 48, 49 and 50, excessive current half cycle storage capacitor C13, resistors R23 and R22 and conductor 51 to the anode of the discharge device V3. When V3 conducts in response to proper conditioning of its grid a unidirectional current is caused to flow through the series circuit above described to charge capacitor C13. Unless and until the capacitor C13 is discharged the charge on the same will be raised in an incremental step each time the discharge device V3 is rendered conductive. Since the discharge device V3 is rendered conductive only in response to half cycles of excessive current flowing between the workpieces being welded the charge on capacitor C13 at any given time during a welding operation will have a direct relation to the number of half cycles of excessive current evidenced during the flash welding operation.

A normally negative hold-off bias is supplied to the screen grid of the discharge device V3 by a screen grid biasing circuit comprising a rectifier SR9, capacitor C8, a voltage divider including the resistors R61 and R62, resistor R15 and the lower portion of the secondary T2S3 of the supply transformer T2. The lower portion of the transformer secondary T2S3 is interconnected with the rectifier SR9 by conductors 40 and 53 and with the cathode of discharge device V3 by conductor 46. The capacitor C8 is charged through the rectifier SR9 and the transformer secondary T2S3 in such a manner that the left terminal assumes a negative charge with respect to the right terminal thereof. Thus, a negative potential is placed on the screen grid of the discharge device V3 with respect to the cathode thereof which normally maintains this discharge device non-conductive. However, as explained above, when a positive signal derived from the transformer T6 and/or the decaying flux in transformer T7 is applied to the grid of the discharge device V3 the same overrides the effect of the negative hold-off bias on the screen grid thereof and this discharge device conducts to place an incremental charge on the storage capacitor C13.

Connected across the resistor R22 which is in series with the discharge device V3 and the storage capacitor C13 by means of a transformer T13 is a neon bulb NE2. The neon bulb NE2 is adapted to provide a visual flash each time the discharge device V3 is rendered conductive and the storage capacitor C13 is incrementally charged.

The storage capacitor C13, in addition to being in the anode-cathode circuit of discharge device V3, is also in a grid-cathode biasing circuit for a discharge device V4. The discharge device V4 has its cathode connected with the upper terminal of the secondary T2S4 of transformer T2 by conductor 54 while the anode is connected by conductor 55 having the primaries of transformers T8–1 and T8–2 connected in series therewith to the lower terminal of the secondary T2S4.

The screen grid of the discharge device V4 is tied to its cathode while a grid biasing circuit, including the storage capacitor C13, is provided for supplying biasing potentials to the control grid. A biasing capacitor C15 is charged with the left terminal thereof positive by a circuit including the secondary of transformer T12, three rectifiers SR19, SR20 and SR21 and a resistor R26. The primary of transformer T12 is connected by conductors 38 and 39 across the secondary T2S2 of the transformer T2. The capacitor C15 is charged at all times to a constant value and serves as a relatively constant direct current source. The potential across the terminals of the capacitor C15 is applied across series connected resistor R25, said resistor having a relatively high resistance, and the winding of a potentiometer P2 which are connected in parallel thereacross. The potential appearing across the resistor R25 and the left portion of the winding of the potentiometer P2 (that portion of the potentiometer between its movable pointer 56 and the left terminal thereof) is applied across series and a stepped variable resistance bridge SW1 which are connected in parallel therewith. It will be noted that one terminal of the stepped variable resistance bridge is connected to the movable pointer 56 of the potentiometer P2 whereby when the pointer is moved the voltage across the resistance bridge SW1 will vary accordingly. The pointer 57 of the stepped variable resistance bridge SW1 is connected through resistor R24 to the grid of the discharge device V4 while the cathode thereof is connected by conductors 54 and 51, resistor R23 and storage capacitor C13 to the right terminal of the resistance bridge SW1.

It will be observed that when the capacitor C13 is discharged the grid biasing circuit will apply a constant but easily and readily adjustable negative hold-off bias on the grid of the discharge device V4 which maintains the same non-conductive. This hold-off bias is equal to the voltage drop across the left portion of the stepped variable resistance bridge SW1 (that portion between the left terminal thereof and the movable pointer 57). To change the value of the negative hold-off bias on the grid of the discharge device V4 it is only necessary to move the pointer 57 of the stepped variable resistance bridge SW1 to a different contact. The stepped variable resistance bridge SW1 is shown to have seven contacts but it should be understood that more or less contacts may be provided as is desired. The stepped variable resistance bridge SW1, in combination with the potentiometer P2, provides a means for accurately and precisely varying the relatively constant hold-off bias impressed on the grid of the discharge device V4. As will be later explained, the amount of hold-off bias supplied to the grid of this discharge device determines the number of half cycles of excessive heating current which comprise a heat unit.

As explained previously, each time the discharge device V3 conducts the capacitor C13 is incrementally charged with the upper terminal thereof positive. The potential on the capacitor C13 is in opposition to the hold-off bias evidenced across the left portion of the stepped variable resistance bridge SW1. After the discharge device V3 has conducted a predetermined number of times the charge on the capacitor C13 will have been built up to such a value that the same overcomes the effect of the negative hold-off bias and supplies a positive control potential to the grid of the discharge device V4 which renders the same conductive. Thus, the discharge device V3 will conduct a predetermined number of times (representing a number of half cycles of excessive flash welding current) before the discharge device V4 is energized (representing one heat unit) and the number of half cycles making up a heat unit is adjustable by varying the movable pointer 57 of the stepped variable resistance bridge SW1 and by varying the pointer 56 of the potentiometer P2.

Relay contacts 58 are provided in shunting relation with respect to the storage capacitor C13 and the resistor R23 which are normally maintained in an open condition during flash welding operations. However, when the flash welding apparatus is not welding these contacts are closed whereby initiating potential is withheld from the discharge device V4 and the capacitor C13 is discharged.

When the discharge device V4 conducts the transformers T8–1 and T8–2 in the anode cathode circuit thereof are energized. The secondary of the transformer T8–2 is connected in the grid biasing circuit of a discharge device V7 and is adapted to impress between the grid and the cathode of this discharge device a control potential which will render the same conductive. The discharge device V7 is connected in series with a resistor R21 and both this discharge device and the resistor R21 are connected in parallel across the storage capacitor C13 by conductors 50 and 59. The grid biasing circuit for the discharge device V7 comprises a capacitor C12 which is charged with the lower terminal thereof positive by a supply circuit including resistors R17 and R18, rectifier SR18 and one secondary of transformer T11 via conductors 60 and 61. The primary of transformer T11 is connected with the primary of transformer T12 which is in turn connected to the secondary T2S2 of the transformer T2 as above described. The potential across the capacitor C12 is evidenced across resistor R19 which, in combination with the secondary of the transformer T8–2 and resistor R58, is connected between the grid and cathode of the discharge device V7. The capacitor C12 normally impresses a negative hold-off bias on the discharge device V7 to hold the same non-conductive. However, when discharge device V4 is energized a positive control potential is applied which momentarily swings the grid of the discharge device V7 positive with respect to its cathode whereby the same begins to conduct. Anode-cathode potential for the discharge device V7 is supplied by the voltage across the capacitor C13 which is always charged when the discharge device V7 is rendered conductive. The effect of this is to discharge the capacitor C13. The voltage drop across the resistor R21, supplied by a circuit including the secondary T2S5 of the supply transformer T2, conductors 62 and 63, rectifier SR11 and resistor R20, provides an additional voltage in the anode-cathode circuit of the discharge device V7 to insure that the capacitor C13 is discharged to substantially zero potential. The discharge device V7 serves as a means for discharging the capacitor C13 after the same has been charged to a preset but adjustable voltage level representing the number of half cycles of excessive flash welding current making up a heat unit.

The transformer T8-1 has its secondary connected between the grid and cathode of a discharge device V5 by conductors 64 and 65 and resistor R28 whereby this discharge device is conditioned for conduction when the discharge device V4 is energized. Negative hold-off bias is supplied to the screen grid of the discharge device V5 by capacitor C16 which is appropriately charged by a charging circuit including conductors 66 and 48 and the lower portion of secondary T1S1 of transformer T1 and rectifiers SR12 and SR13 over a biasing network comprising a voltage divider made up of the resistors R63 and R64, resistor R30 and resistor R29. Connected in parallel relation with respect to the resistor R30 is a capacitor C17 and, via conductors 67 and 68, the secondary of a signal transformer T9 whose function will become hereinafter more fully apparent. Thus, negative hold-off potential is normally supplied to the screen grid of the discharge device V5 to hold the same non-conductive but when the discharge device V4 fires a positive control signal is placed on the grid of the discharge device V5 whereby the same is conditioned for conduction.

The cathode of the discharge device V5 is connected to the secondary T1S1 of transformer T1 by conductor 48 while the anode is connected thereto by conductor 69, resistor R31, resistor R32, storage capacitor C20, conductor 70 and conductor 47. The arrangement is such that the storage capacitor C20 will be charged in incremental steps with the upper terminal thereof positive when the discharge device V5 conducts. Each firing of the discharge device V5 represents the occurrence of one heat unit in the flash welding current and the charge on the storage capacitor C20 represents and is proportional to the number of heat units which have been passed during any given flash welding operation.

The storage capacitor C20 is also connected in the grid-cathode biasing circuit for a discharge device V6 and is adapted to trigger the same when the potential thereacross reaches a predetermined level. The grid biasing circuit for the discharge device V6 comprises resistor R32, storage capacitor C20, the left portion of a stepped variable resistance bridge SW2 (that portion between the left terminal thereof and its movable pointer 71), the movable pointer 71, resistor R35, conductor 72 which is connected to the grid of this discharge device, conductor 73 attached to the cathode thereof and conductor 69 that leads back to the resistor R32. The stepped variable resistance bridge SW2 is connected in parallel relation across a resistor R33 and the left portion of a potentiometer P3 (that portion between the left terminal thereof and its movable pointer 74). The resistor R33 and the potentiometer P3 are in turn connected in parallel across charging capacitor C21. This latter circuit component is charged through a circuit comprising three rectifiers SR15, SR16 and SR17, resistor R34 one secondary of transformer T11 connected in conductor 75, the upper portion of secondary T1S1 of transformer T1, conductor 47 and conductor 70. The arrangement is such that a negative hold-off biasing voltage is developed across the left portion of the stepped variable resistance bridge SW2 which maintains the discharge device V6 non-conductive when the capacitor C20 is discharged. The amount or level of this hold-off bias is readily and easily adjustable by moving the movable pointers 71 and 74 of the stepped variable resistance bridge SW2 and the potentiometer P3 whereby the discharge device V6 will begin to conduct only after a predetermined number of heat units have taken place during a flash welding operation. When the potential on storage capacitor C20 reaches a level corresponding to the preset number of heat units which renders a flash welding operation unacceptable, this capacitor, being charged with a polarity opposite to the polarity developed across the left portion of the stepped variable resistance bridge SW2, will gain control and swing the grid of the discharge device V6 positive with respect to its cathode whereby the same is conditioned for conduction.

Relay contacts 77 are provided in parallel relation with the storage capacitor C20 and the resistor R32 and these contacts are normally maintained open during flash welding operations. However, after a flash welding operation has been completed these contacts are closed to allow the dissipation of the charge on the capacitor C20 and to prevent a positive firing signal from being impressed on the grid of the discharge device V6. It will be noted that the grid biasing circuits for the discharge devices V4 and V6 are primarily the same although the capacitor C13 is charged in response to half cycles of excessive flash welding current while the capacitor C20 is charged in response to heat units. Each of the heat units is composed of a predetermined but adjustable number of half cycles of excessive flash welding current and the discharge device V6 will fire only after a predetermined but adjustable number of the heat units have passed during a given flash welding operation. The current monitor utilizes, in essence, a pair of cascaded adjustable counters for counting the half cycles of excessive current and the resultant heat units.

The cathode of the discharge device V6 is connected to one terminal of the secondary T1S2 of transformer T1 by conductors 73 and 79 while the anode is connected to the other terminal of the transformer secondary through a series circuit comprising rectifier SR23, the winding of a control relay CR1, on off-on switch 81 and conductor 82. When the discharge device V6 conducts (in response to the storage capacitor being charged to a predetermined level and providing the off-on switch in the on position) a uni-directional current will flow which energizes the winding of relay CR1 to close the contacts associated therewith. The contacts of the relay CR1 are connected by the conductors 83 and 84 to the sequence timer 21 for the flash welding apparatus and are adapted to interrupt the flash welding operation to prevent the flow of upset current between the workpieces.

Since the discharge device V6 only conducts on alternate half cycles of the supply line voltage it is desired to provide a resistor R38 in parallel with the winding of the relay CR1 to prevent relay chatter due to the stored magnetic energy in the winding of the relay coil. Also connected in parallel across the winding of the relay CR1 is a neon bulb NE4 and a resistor R37. The neon bulb NE4 is energized each time the discharge device V6 fires to indicate that an objectionable number of heat units have been passed and that an unacceptable flash welding operation is taking place.

Also connected in parallel with the control relay CR1 and the off-on switch 81 is a rectifier SR22 and the primary of the transformer T9, the secondary of which, as set forth above, is in the screen grid biasing circuit for the discharge device V5. When the discharge device V6 fires a control signal due to the decaying flux in transformer T9 is impressed on the screen grid of discharge device V5 which hold the same conductive until the discharge device V6 ceases conduction.

When discharge device V6 fires the sequence of the flash welder is interrupted to block completion of the defective flash welding operation. Of course, the current monitor of the present invention is not specifically limited to this use since the contacts of the relays CR1 could be used to control or otherwise correct the flash welding operation. When the sequence timer of the flash welding apparatus has timed out the relay contacts 58 and 77 positioned across the storage capacitors C13 and C20, respectively, are closed and as a result discharge devices V5 and V6 will cease conduction so that the relay CR1 becomes deenergized. With the opening of the contacts 58 and 77 the current monitor returns to its standby state and is ready to indicate and/or interrupt another defective flash welding operation. The control circuitry for energizing the contacts of the relay contacts 58 and 77 is not shown but this can be accomplished in an automatic manner as will be understood by those skilled in the art.

*Operation*

Considering now the overall operation of the flash welding current monitor of the present invention, it will be assumed that the monitor is in a standby status and that a defective flash welding operation is being performed. When a half cycle of excessive flash welding current is experienced during flashing or arcing a voltage signal will be developed across the output terminals of the current transformer CT which is stepped up by the transformer T3 and rectified by the rectifiers SR1, SR2, SR3 and SR4 that charges the capacitor C1. According to the instantaneous polarity of the supply line voltage the charge on the capacitor C1 will cause either the discharge device V1 or V2 to conduct because the potential across the capacitor C1 overrides the normally negative hold-off bias supplied to these two discharge devices. When discharge device V1 is triggered the secondary of the transformer T6 supplies a positive control signal to the grid of the discharge device V3 causing the same to fire despite the negative hold-off bias on the screen grid thereof. When the discharge device V2 conducts the decaying flux of the secondary of the transformer T7 supplies a positive control signal to the grid of discharge device V3 which will also render this latter discharge device conductive. The discharge devices V1 and V2 are so connected that the discharge device V3 will conduct for both positive and negative half cycles of excessive heating current.

The conduction of the discharge device V3 places an incremental charge on the capacitor C13 and this charge continues to build up every time the discharge device V3 conducts until the potential across the capacitor C13 is sufficient to overcome the hold-off bias on the grid of the discharge device V4 and trigger the same. The hold-off bias for the discharge device V4 is adjustable by manipulating the pointers of the variable resistance bridge SW1 and the potentiometer P2 as clearly set forth above to allow this discharge device to be triggered only after a preset number of half cycles of excessive flash welding current have occurred.

When discharge device V4 conducts the transformers T8–1 and T8–2 are energized to supply positive control signals to the grids of the discharge devices V5 and V7, respectively, thereby causing the same to conduct. The discharge device V7 conducts due to the charge on the capacitor C13 and an additional voltage drop evidenced across the resistor R21 is supplied in the anode-cathode circuit of this discharged device to insure that the capacitor C13 discharges to substantially zero potential. In this manner the capacitor C13 is immediately conditioned to continue the counting of the half cycles of excessive heating current.

The conduction of the discharge device V5 supplies a charge for the capacitor C20. The charge on capacitor C20 is raised in incremental steps by repeated conductions of the discharge device V5 until this charge overcomes the hold-off bias supplied to the discharge device V6. The hold-off bias is readily adjustable by manipulating the movable pointers of the variable resistance bridge SW2 and the potentiometer P3 as clearly set forth above. Each conduction of the discharge device V5 and each incremental charge placed on the capacitor C20 represent one heat unit made up of a predetermined number of half cycles of excessive heating current. After a predetermined number of heat units have been evidenced the charge on the capacitor C20 will override the hold-off bias on the discharge device V6 and the same will begin to conduct.

Discharge device V6 conducts and energizes the winding of the control relay CR1 and the contacts thereof close to interrupt the flash welding operation and prevent the flow of upset current. The decaying flux in the secondary of transformer T9 supplies a positive pulse to the screen grid biasing circuit of the discharge device V5 and therefore this discharge device is locked in and kept conducting as long as discharge device V6 remains conductive. When the sequence of the flash welder is over the relay contacts 58 and 77 across the capacitors C13 and C20 will close and as a result discharge devices V5 and V6 will cease conduction thereby deenergizing the winding of the control relay CR1. When the relay contacts 58 and 77 are opened the current monitor is again in its standby state and is adapted to monitor another flash welding operation. Of course, if the flash welding operation is acceptable and not enough half-cycles of excessive heating current and the resultant heat units are recorded by the current monitor the flash welding operation will be allowed to proceed to completion.

It should now be apparent that the objects initially set forth have been accomplished. We have provided an extremely versatile and highly simplified current monitor for flash welding operations. Although there has been shown and described a preferred embodiment of the invention it should be understood that many changes may be made therein without departing from the clear teachings thereof. Accordingly, reference should be had to the following appended claims in determining the scope and intent of the invention.

We claim:

1. Apparatus for detecting the translation of abnormal power surges in an electrical power supply circuit for electric resistance flash welders and the like comprising a current transformer associated with said circuit, a first capacitor, charging means for said first capacitor including rectifier means and said current transformer, a second capacitor, a relatively constant direct current charging source for said second capacitor, a pair of inversely connected discharge devices each having at least one control grid, a common grid circuit for said pair of discharge devices comprising said first and said second capacitors, said first and said second capacitors being connected in said common grid circuit in opposing relation whereby either of said pair of discharge devices will conduct upon the passage of half cycles of excessive flashing current, a third discharge device, means conditioning said third discharge device for conduction upon conduction of either of said pair of discharge devices, a first storage capacitor in the anode-cathode circuit of said third discharge device, said first storage capacitor being charged in incremental steps by repeated conductions of said third discharge device, a fourth discharge device having at least one control grid, a grid circuit for said fourth discharge device, said grid circuit comprising said first storage capacitor and an adjustable source of biasing potential connected in opposition to the charge on said first storage capacitor, said fourth discharge device being rendered conductive when said first storage capacitor is charged to a predetermined level, a fifth discharge device, means rendering said fifth discharge device conductive in response to conduction of said fourth discharge device, a second storage capacitor in the anode-cathode circuit of said fifth discharge device, said second storage capacitor being charged in incremental steps by repeated conductions of said fifth discharge device, a sixth discharge device having at least one control grid, a grid circuit for said sixth discharge device, said last mentioned grid circuit comprising said second storage capacitor and an adjustable source of biasing potential connected in opposition to the charge on said second storage capacitor, said sixth discharge device being rendered conductive when said second storage capacitor is charged to a predetermined level, and detecting means responsive to the conduction of said sixth discharge device.

2. Apparatus according to claim 1 further comprising means to discharge said first storage capacitor upon conduction of said fourth discharge device, said last mentioned means comprising a seventh discharge device connected in parallel across said first storage capacitor, means maintaining said seventh discharge device normally non-conductive, means to initiate conduction of said seventh discharge device, and said means to initiate conduction being responsive to the conduction of said fourth discharge device.

3. Apparatus for detecting the translation of abnormal power surges in an electrical power supply circuit for electric resistance flash welders and the like comprising a current transformer associated with said circuit, a first discharge device, means maintaining said first discharge device normally non-conductive, means for initiating conduction of said first discharge device in response to the passage of half cycles of excessive current as detected by said current transformer, a storage capacitor, means charging said storage capacitor in response to the conduction of said first discharge device, a second discharge device having at least one control grid, a grid circuit for said second discharge device, said grid circuit comprising said storage capacitor and a source of biasing potential connected in opposing relation with respect to the charge on said storage capacitor, said second discharge device being rendered conductive when the charge on said storage capacitor reaches a predetermined level, and means responsive to the conduction of said second discharge device for indicating defective power translation.

4. Apparatus according to claim 3 further comprising means to discharge said storage capacitor upon actuation of said means responsive, said means to discharge comprising a third discharge device connected in parallel across said storage capacitor, means maintaining said third discharge device normally non-conductive, and means rendering said third discharge device conductive in response to the actuation of said means responsive.

5. Apparatus according to claim 4 further characterized in that said means to discharge comprises a circuit element in series with said third discharge device and said storage capacitor, and means to impress a potential across said circuit element in opposition to the potential across said storage capacitor whereby the potential across said storage capacitor is reduced to substantially zero.

6. Apparatus according to claim 3 further characterized in that said opposing source of biasing potential comprises a source of direct current, a potentiometer having a movable pointer connected across said source of direct current, a variable resistance bridge having a movable pointer connected in parallel across said movable pointer and a portion of said potentiometer, and said movable pointer of said variable resistance bridge being connected to said control grid of said second discharge device.

7. Apparatus according to claim 3 further characterized in that said opposing source of biasing potential comprises a source of direct current, a potentiometer having a movable pointer connected in parallel across said source of direct current, and means interconnecting said movable pointer and said control grid of said second discharge device.

8. Apparatus for detecting the translation of abnormal power surges in an electrical power supply circuit for electric resistance flash welders and the like comprising a current transformer associated with said circuit, a first discharge device, means maintaining said first discharge device normally non-conductive, means for initiating conduction of said first discharge device in response to the passage of half cycles of excessive current as detected by said current transformer, a storage capacitor, means charging said storage capacitor in response to the conduction of said first discharge device, a second discharge device, means maintaining said second discharge device normally non-conductive, means rendering said second discharge device conductive, said last mentioned means comprising said storage capacitor, and detection means responsive to the conduction of said second discharge device for indicating defective power translation.

9. Apparatus according to claim 8 further characterized in that said means for initiating conduction of said first discharge device comprises third and fourth discharge devices connected in inverse relation with respect to each other, a common grid circuit for said third and said fourth discharge devices, said common grid circuit comprising a constant source of biasing potential normally holding said third and said fourth discharge devices non-conductive, said common grid circuit further comprising a variable source of biasing potential connected in opposition to said constant source, and means to regulate said second source in response to the current detected by said current transformer whereby said third and said fourth discharge devices are rendered conductive during alternate half cycles of excessive current translated.

10. Apparatus according to claim 9 further characterized in that said variable source comprises a capacitor, said means to regulate comprising said current transformer, and a full wave rectifier bridge interconnecting said capacitor and said current transformer.

11. Apparatus according to claim 9 characterized in that said means for initiating conduction of said first discharge device further comprises transformer means in the anode-cathode circuits of said third and said fourth discharge devices, said first discharge device having at least one control grid, a grid control circuit for said control grid of said first discharge device, and said grid control circuit comprising said transformer means.

12. Apparatus for detecting the translation of abnormal power surges in an electrical power supply circuit for electric resistance flash welders and the like comprising a current transformer associated with said circuit, a first discharge device, means maintaining said first discharge device normally non-conductive, means for initiating conduction of said first discharge device in response to the passage of half cycles of excessive welding current, a first storage capacitor, means for charging said first storage capacitor in response to the conduction of said first discharge device, a second discharge device, means maintaining said second discharge device normally non-conductive, means for initiating conduction of said second discharge device, said last mentioned means for initiating conduction comprising said first storage capacitor when the same is charged to a predetermined level, a second storage capacitor, means to charge said second storage capacitor in response to conduction of said second discharge device, a third discharge device, means maintaining said third discharge device normally non-conductive, means for initiating conduction of said third discharge device comprising said second storage capacitor when the same is charged to a predetermined level, and detection means responsive to the conduction of said third discharge device for indicating defective power translation.

13. Apparatus according to claim 12 further characterized in that said second discharge device has at least one control grid, said means maintaining said second discharge device normally non-conductive comprising a grid biasing circuit having means for supplying hold-off bias to said control grid, and said grid biasing circuit further comprising means responsive to conduction of said third discharge device to override said means for supply hold-off bias to said control grid to maintain said second discharge device conductive as long as said third discharge device is conductive.

14. Apparatus according to claim 13 further characterized in that said means for initiating conduction of said second discharge device comprises a fourth discharge device, said fourth discharge device having a control grid, a grid control circuit for said control grid comprising said first storage capacitor and a source of biasing potential connected in opposing relation with respect to the charge on said first storage capacitor, said fourth discharge device being rendered conductive upon said first storage capacitor being charged to a predetermined level, and means initiating conduction of said second discharge device in response to conduction of said fourth discharge device.

15. Apparatus according to claim 13 further characterized in that said means responsive to the conduction of said third discharge device comprises a relay having a winding, said winding of said relay being energized upon conduction of said third discharge device, said relay having at least a pair of contacts, and said contacts of said relay being switched upon energization of said third discharge device.

References Cited in the file of this patent

UNITED STATES PATENTS

| | | |
|---|---|---|
| 1,919,978 | Dempster | July 25, 1933 |
| 1,938,499 | Rusdale | Dec. 5, 1933 |
| 1,948,337 | Crawford | Feb. 20, 1934 |
| 2,007,698 | Tear | July 9, 1935 |
| 2,101,108 | Tarbox | Dec. 7, 1937 |
| 2,264,067 | Chambers | Nov. 25, 1941 |
| 2,739,215 | Van Ness | Mar. 20, 1956 |
| 2,740,044 | Storm | Mar. 27, 1956 |